United States Patent
Masek et al.

(10) Patent No.: US 9,797,699 B2
(45) Date of Patent: Oct. 24, 2017

(54) OFF-AXIS LOADCELL FORCE SENSING TO AUTOMATICALLY DETERMINE LOCATION OF SPECIMEN FEATURES

(71) Applicant: ILLINOIS TOOL WORKS INC., Glenview, IL (US)

(72) Inventors: William Masek, North Attleboro, MA (US); Michael Taliaferro, Dallas, TX (US); Jeffrey Manney, South Easton, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 137 days.

(21) Appl. No.: 14/912,199

(22) PCT Filed: Aug. 12, 2014

(86) PCT No.: PCT/US2014/050791
§ 371 (c)(1),
(2) Date: Feb. 16, 2016

(87) PCT Pub. No.: WO2015/026580
PCT Pub. Date: Feb. 26, 2015

(65) Prior Publication Data
US 2016/0202035 A1 Jul. 14, 2016

Related U.S. Application Data

(60) Provisional application No. 61/868,916, filed on Aug. 22, 2013.

(51) Int. Cl.
*G01B 5/004* (2006.01)
*G01B 21/04* (2006.01)

(52) U.S. Cl.
CPC ............ *G01B 5/004* (2013.01); *G01B 21/04* (2013.01); *G05B 2219/37608* (2013.01)

(58) Field of Classification Search
CPC .................................................. G01B 15/004
(Continued)

(56) References Cited

U.S. PATENT DOCUMENTS 4,084,323 A * 4/1978 McMurtry ............... B23Q 1/36
33/1 M
4,190,889 A 2/1980 Etoh et al.
(Continued)

FOREIGN PATENT DOCUMENTS

EP 0092021 A2 10/1983
EP 0501710 A1 9/1992
(Continued)

OTHER PUBLICATIONS

ISR and WO for PCT/US2014/050791 dated Nov. 6, 2014.

*Primary Examiner* — G. Bradley Bennett
(74) *Attorney, Agent, or Firm* — McCarter & English, LLP

(57) ABSTRACT

The present disclosure relates to a method in materials testing to automatically locate the center of a feature on or in an object using the off-axis force feedback of a loadcell. In this disclosure, either a simplified model of the product or device being tested, or the product itself, is placed under the loadcell probe with the feature of interest roughly aligned under the probe tip. The probe is driven down into the feature. The product is automatically positioned relative to the probe in the x-direction until the side of the probe contacts the side of the feature. Contact is determined by monitoring the force feedback from the loadcell. When the vertical force from the side-load surpasses a pre-determined setpoint, contact is assumed and the value of the x-position of the product with respect to the probe is recorded. The product is then repositioned in the opposite direction in the x-axis to record the touch load on the other side. The center is then calculated as the average of the x values. The process (Continued)

is repeated along the y-axis. This data is then used to calculate the center of the feature and the product can be positioned at this location so that the probe is centered over the center thereof.

18 Claims, 5 Drawing Sheets

(58) Field of Classification Search
USPC .......................................................... 33/503
See application file for complete search history.

(56) References Cited

U.S. PATENT DOCUMENTS

| | | | |
|---|---|---|---|
| 4,485,453 A | 11/1984 | Taylor | |
| 4,716,656 A * | 1/1988 | Maddock | B23Q 1/36 33/503 |
| 5,179,788 A | 1/1993 | Jadach | |
| 5,435,072 A * | 7/1995 | Lloyd | G01B 7/002 33/559 |
| 5,505,005 A * | 4/1996 | McMurtry | B23Q 5/58 33/558 |
| 5,526,576 A * | 6/1996 | Fuchs | G01B 7/012 33/503 |
| 6,449,861 B1 * | 9/2002 | Danielli | G01B 5/012 33/503 |
| 2014/0317942 A1 * | 10/2014 | Sagemueller | G01B 21/042 33/503 |
| 2016/0084625 A1 * | 3/2016 | Pettersson | G01B 5/008 33/503 |
| 2016/0169656 A1 * | 6/2016 | Padovani | G01B 21/047 33/503 |

FOREIGN PATENT DOCUMENTS

| | | |
|---|---|---|
| JP | S5872004 A | 4/1983 |
| JP | S60104209 A | 6/1985 |

* cited by examiner

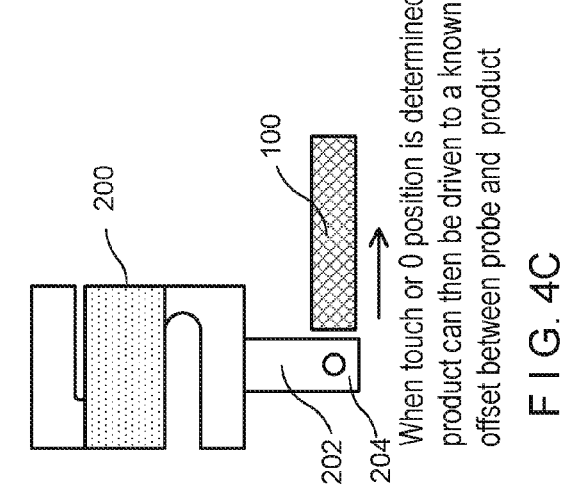
FIG. 3
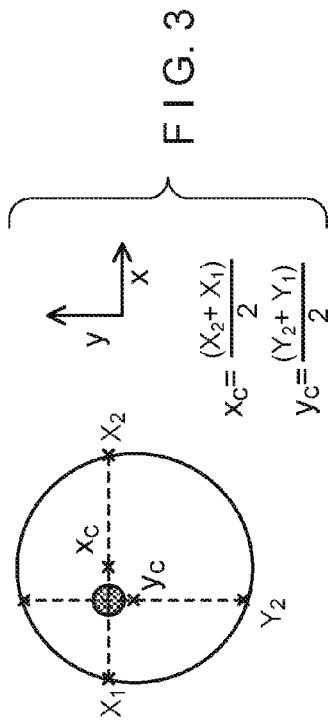
FIG. 4A
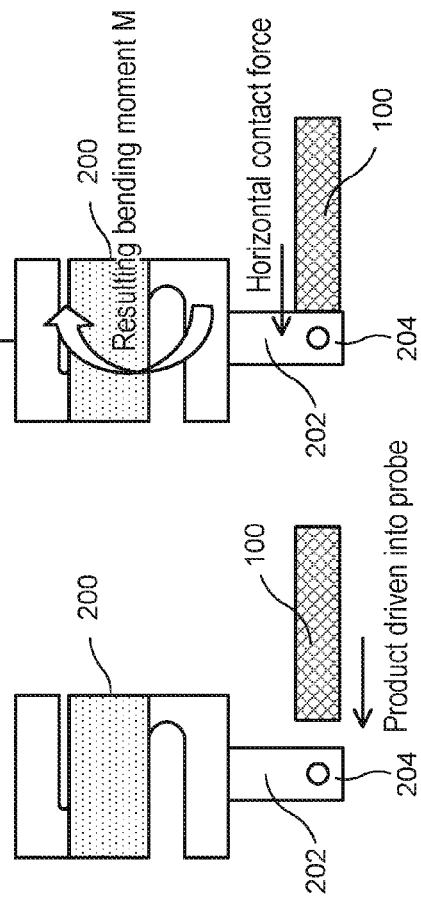
FIG. 4B
FIG. 4C

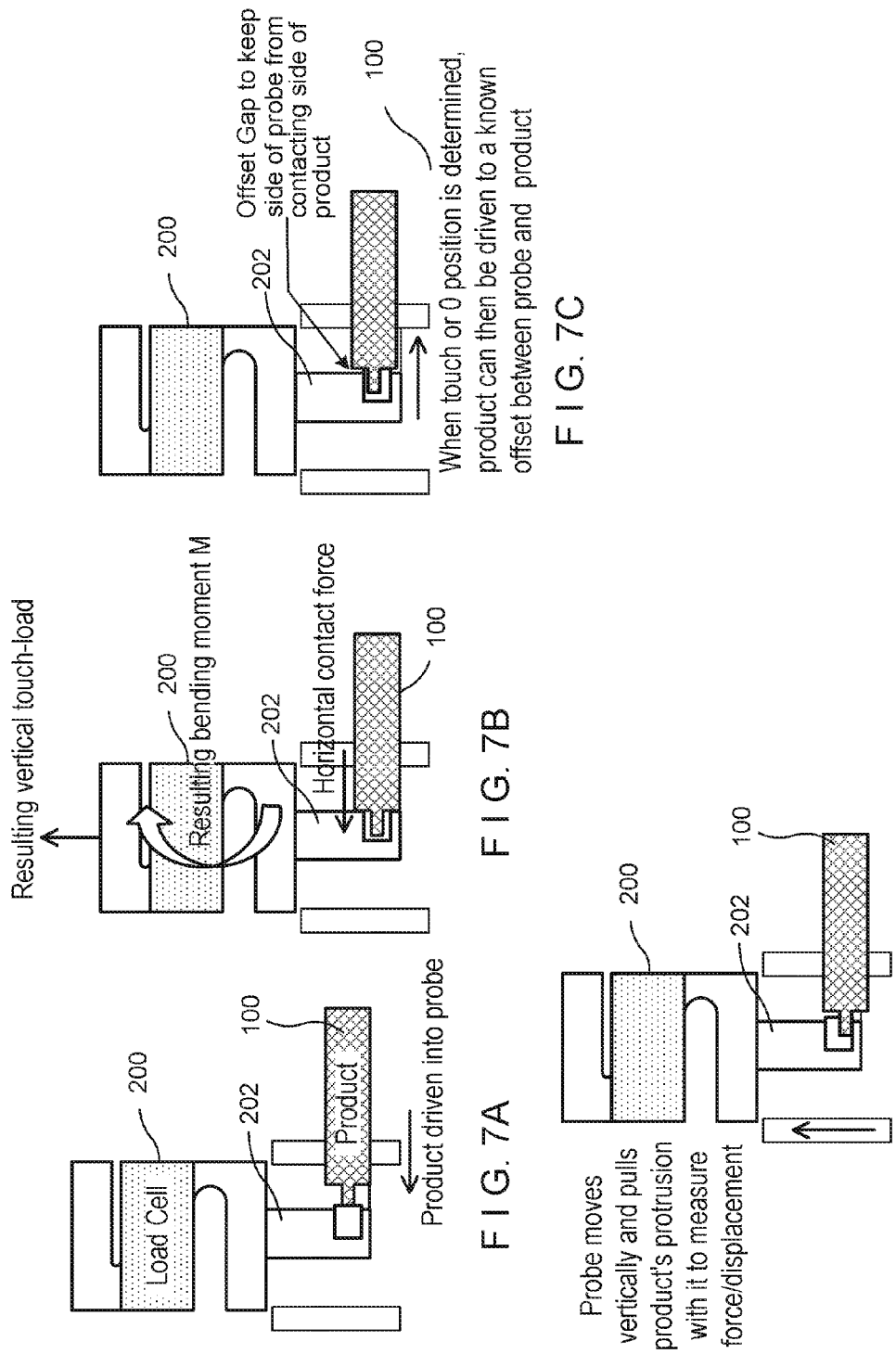

OFF-AXIS LOADCELL FORCE SENSING TO AUTOMATICALLY DETERMINE LOCATION OF SPECIMEN FEATURES

This application is a National Phase of International Application No. PCT/US2014/050791, filed Aug. 12, 2014, and claims priority under 35 U.S.C. 119(e) of U.S. provisional patent application Ser. No. 61/868,916, filed on Aug. 22, 2013, the contents of which are hereby incorporated by reference in their entirety.

BACKGROUND OF THE DISCLOSURE

Field of the Disclosure

The present disclosure relates to a method in materials testing to automatically locate the center of a feature on or in an object using the off-axis force feedback of a loadcell.

Description of the Prior Art

In materials testing, measuring the force and displacement characteristics of compliant features in or on an object can require precise placement of the probe tip of the displacement sensor. This can be due to the variability of the force/displacement with the position of the compliant feature of interest. Therefore, slight offsets from the intended location of measurement can result in widely varying force/displacement results.

In the prior art, a technique for aligning the center of the feature of interest under the center of the probe involves a human attempting to visually and manually align them. This is subjective and error-prone resulting in potentially high positional error in the alignment of the probe to the center of the feature, which can result in erroneous force/displacement results.

Additionally, touch probes or kinematic resistive probes have been developed by Renishaw and Marposs to determine the location of parts and features in a materials testing environment.

OBJECTS AND SUMMARY OF THE DISCLOSURE

It is therefore an object of the present disclosure to accurately and automatically locate the center of a feature in a materials testing application.

These and other objects are obtained by providing a method and apparatus wherein either a simplified model of the product or device being tested, or the product itself, is placed under the loadcell probe with the feature of interest roughly aligned under the probe tip. The probe is driven down into the feature. The product is automatically positioned relative to the probe in the x-direction until the side of the probe contacts the side of the feature. Contact is determined by monitoring the force feedback from the loadcell. When the vertical force from the side-load surpassed a pre-determined setpoint, contact is assumed and the value of the x-position of the product with respect to the probe is recorded. The product is then repositioned in the opposite direction in the x-axis to record the touch load on the other side. The center is then calculated as the average of the x values. The process is repeated along the y-axis. This data is then used to calculate the center of the feature and the product can be positioned at this location so that the probe is centered over the center thereof.

An advantage of the resulting automated method and apparatus is that the subjectivity of a human operator visually locating the center of a feature is replaced by a quantitative and more accurate and repeatable method of precision drive electronics and hardware as well as a highly accurate force sensing loadcell, thereby reducing any error and improving the quality of the results.

The method and apparatus of the present disclosure has many applications, including, but not limited to keyboards, safety mats, syringes, cigarettes, computer equipment, and telephones.

BRIEF DESCRIPTION OF THE DRAWINGS

Further objects and advantages of the disclosure will become apparent from the following description and from the accompanying drawings, wherein:

FIG. 3 illustrates the calculations performed with respect to the method illustrated in FIGS. 1 and 2.

FIGS. 4A, 4B and 4C illustrate a second embodiment of the present disclosure.

FIGS. 7A, 7B, 7C and 7D illustrate the further embodiment of FIG. 6.

DETAILED DESCRIPTION OF THE PREFERRED EMBODIMENTS

Pursuant to this disclosure, the method uses either a simplified model of the product, sample or device being tested, or it could use the product 100 itself, or a modification thereof, if the feature of interest can be robustly contacted. The simplified model or product will include a geometric equivalent to the feature of which the center is desired to be located. The technique is as follows:

1. The model, product or sample 100 is placed under the probe 202 of the loadcell 200.

Figure 5:
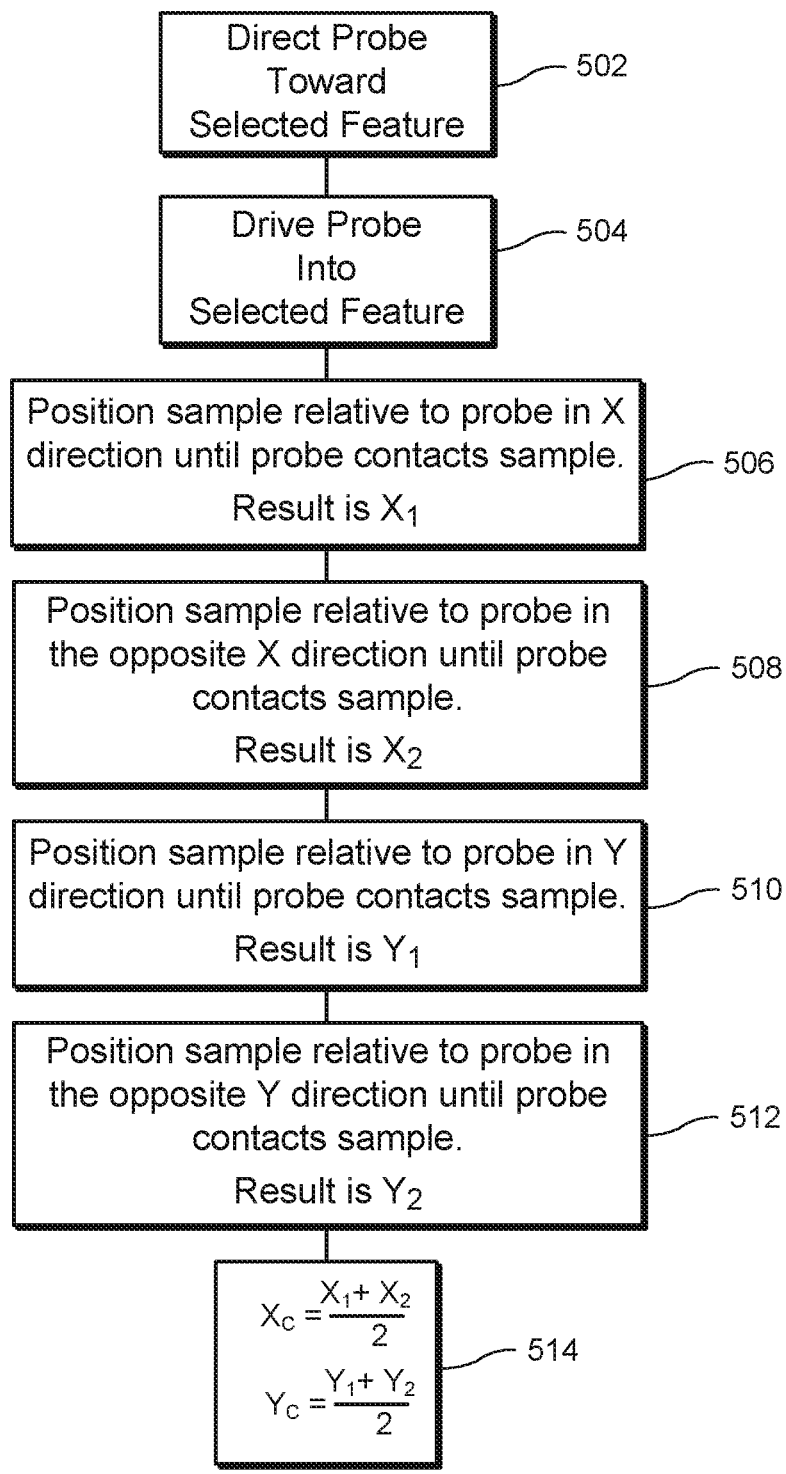
FIG. 5 is a flowchart of an embodiment of the method of the disclosure.

2. The feature of interest, such as, but not limited to, aperture or hole 102, is roughly aligned under the probe tip 204. See FIG. 5, step 502.

Figure 1:
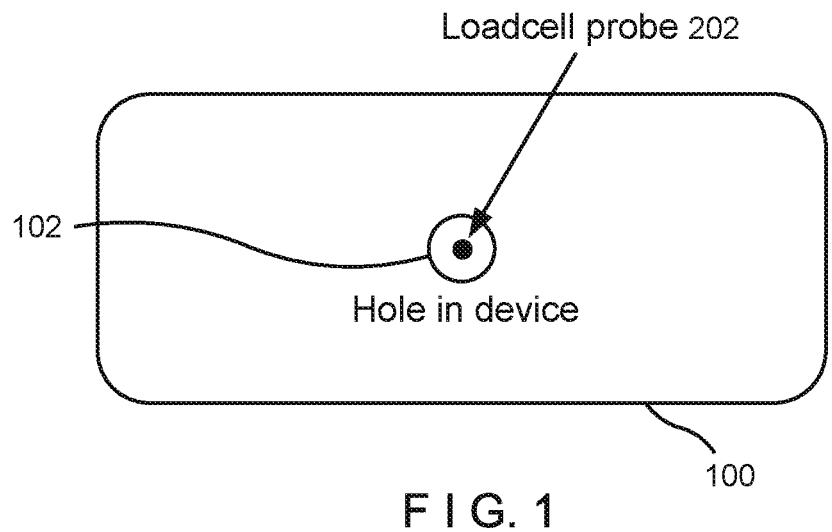
FIG. 1 is a top view of a representative model of the method of the present disclosure.

3. The probe 202 is driven down into the feature 102, which for illustrative purposes is an aperture or hole 102 in the product 100, see FIG. 1. See FIG. 5, step 504.

Figure 2:
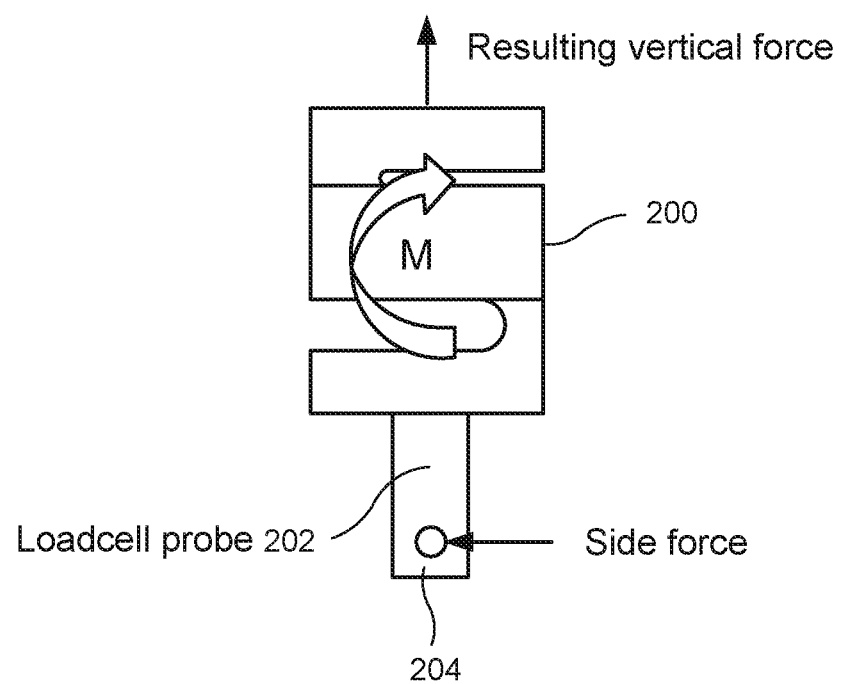
FIG. 2 is a side view corresponding to FIG. 1.

4. The product 100 is automatically positioned or moved relative to the probe 202 in the x direction until the side of the probe 202 contacts the side of the feature 102. See FIG. 5, step 506. Contact is determined by monitoring the force feedback from the loadcell 200 that is induced by the off-axis or side contact of the probe 202 against the side of the aperture or hole 102 as shown in FIG. 2.

5. When the vertical force from the side-load surpasses a pre-determined setpoint, contact is assumed and the value of the x-position of the product 100 with respect to the probe 202 is recorded. This is $x_1$ in FIG. 3. The product 100 is then repositioned or moved in the opposite direction in the x-axis to record touch load on the other side of the hole 102 (see FIG. 5, step 508) and is designated $x_2$. The center of the hole $x_c$ is then calculated to be the equidistant point or average x value between $x_1$ and $x_2$ (see FIG. 5, step 514). The process is then replicated in the y-axis to determine the center of the hole 102 in the y-axis or $y_c$. See FIG. 5, steps 510, 512 and 514.

6. With $x_c$ and $y_c$ determined, the center of the hole or feature 102 is known and the product 100 can be positioned to this location so that the probe 202 is centered over the center of the feature.

Figure 6:
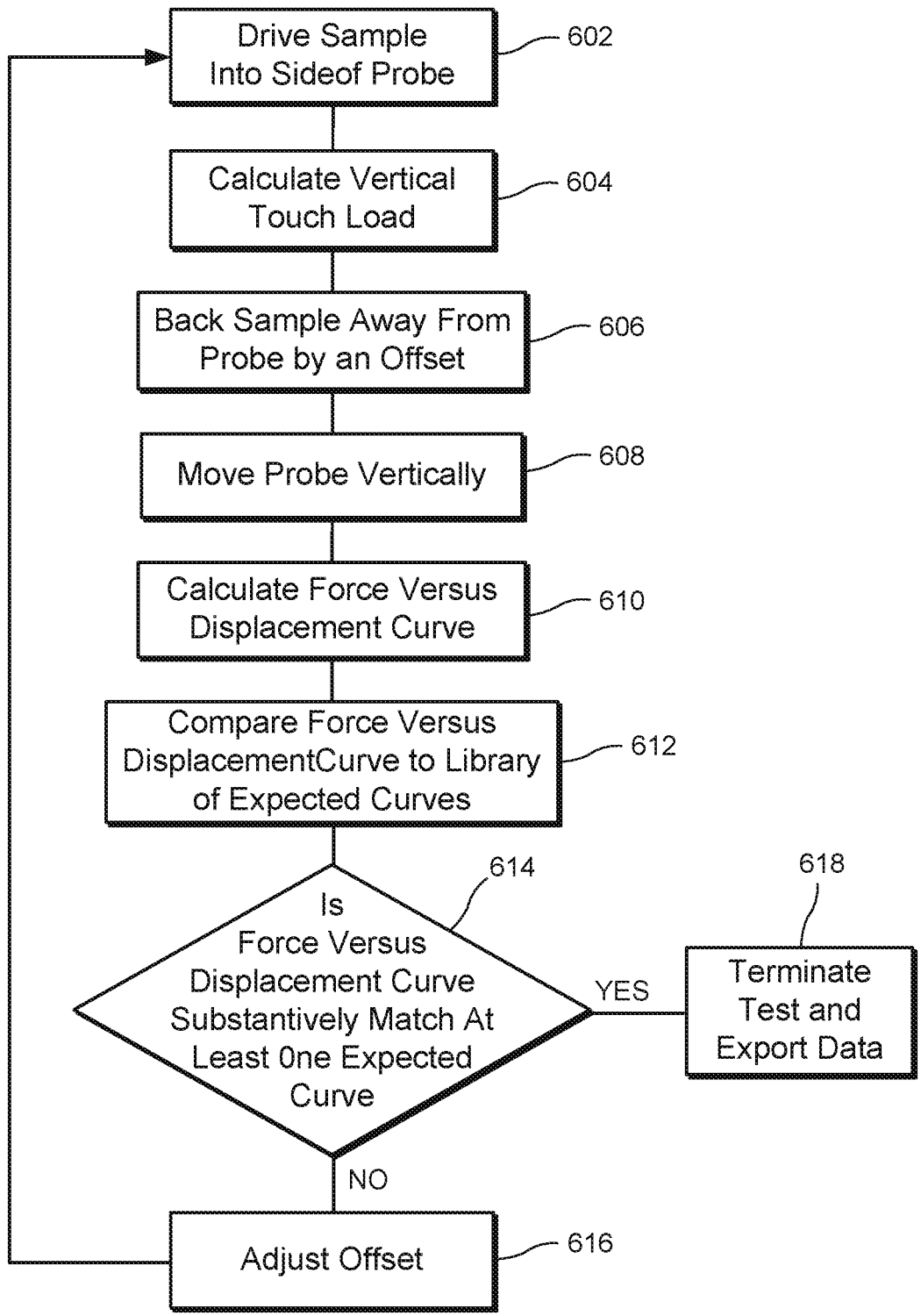
FIG. 6 is a flowchart of a further embodiment of the method of the disclosure.

Another embodiment of the disclosure of detecting the off-axis force signature of a loadcell 200 for detecting feature or product position is shown in FIGS. 4A, 4B and 4C and described as follows:

1. The product 100 is driven or moved into the side of the probe 202 which is attached to a loadcell 200 as shown in FIG. 4A. Also see FIG. 6, step 602 (shown within further embodiment).

2. The vertical force that results from the horizontal loading of the probe 202 and loadcell 200 is monitored for touch-load, which is a minimal but repeatable force that does not permanently deflect or damage the loadcell 200 as shown in FIG. 4B.

3. The position of the resulting touch-load is recorded and the automatic positioning system can back the product 100 or feature 102 away from the probe tip 204 a predetermined amount to ensure accurate offset of probe 202 to the relative position of the feature as shown in FIG. 4C. See FIG. 6, step 604 (shown within further embodiment).

Under optimal conditions, the contact that was initiated between the probe 202 (and loadcell 200) and the product 100 under test would represent the "zero condition" and the product 100 would be driven a software hard-coded fixed distance from the probe 202 to be clear of the product for subsequent tests. The probe 202 would then move up or down to begin its test to measure the force displacement while contacting another part of the product 100.

Occasionally, however, the product 100 under test has variable or inconsistent geometry or compliance in the area of interest that the probe 202 contacts. Additionally, either the probe 202 or the product could be angled in the vertical or z direction. In these suboptimal conditions, the probe 202 could contact the body of the product after it backs off the fixed distance where it is expected to no longer be in contact with the product to begin the test. Upon further motion, the probe 202 and loadcell 200 may incorrectly detect a drag or friction force that will adversely affect the test and results.

To correct this potential problem, another embodiment of this disclosure applies an adaptive zeroing function which is illustrated in FIGS. 6 and 7A-7D. The product or sample 100 is driven into the probe 202 as shown in step 602 of FIG. 6 and FIG. 7A. The resulting vertical touch load is calculated as shown in step 604 of FIG. 6 and FIG. 7B. When the touch position or zero position is determined, the product 100 is driven to a known offset between the probe 202 and the product 100 as shown in step 606 of FIG. 6 and FIG. 7C. The probe is then moved vertically (or orthogonally to the original driving direction) to contact and catch any protrusion on the product or sample 100 as shown in step 608 of FIG. 6 and FIG. 7D. Vertical force and displacement of the protrusion is measured with a horizontal gap between the probe and product being maintained in order to not induce a frictional drag component on the vertical load, see FIG. 6, step 610. If there is a frictional drag load by the probe 202 still being in contact with any part of the product 100 when it should not be, then the expected load versus displacement curve of the abnormal test will look different than curves from normal tests. Typical load versus displacement curves are generated by previous performing tests on samples where it is known that there is no drag of the product or sample 100 on the probe 202. Algorithms compare the actual force versus displacement curves to these previously generated typical force displacement curves (wherein the data may be provided as a database or library of expected curves) and detect if an abnormal curve or test result is being generated. See FIG. 6, steps 610, 612, 614. If the load versus displacement curve of the protrusion appears to be unusual after signal analysis when compared to the previously generated typical load versus displacement curves, this could mean that the horizontal gap is too small and that the probe is still contacting the side of the body of the product 100. This would cause a frictional load that would adversely affect the load versus displacement curve. As shown in steps 614 and 616 of FIG. 6, if an unusual load versus displacement curve is detected, the offset is increased and steps 602-614 are repeated until a normal load versus displacement curve is detected. After iteratively positioning the product 100 and repeating tests until acceptable force versus displacement curves are detected, the test is concluded and the results are exported. See FIG. 6, step 618.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method for locating a center of a selected feature of a sample in a materials testing application, comprising the steps of:
   providing a loadcell, including a probe;
   directing the probe toward the selected feature of the sample;
   driving the probe into the selected feature of the sample;
   positioning the product relative to the probe in a first direction until the probe contacts a first side of the selected feature;
   positioning the product relative to the probe in an opposite of the first direction until the probe contacts a second side of the selected feature;
   positioning the product relative to the probe in a second direction until the probe contacts a third side of the selected feature; and
   positioning the product relative to the probe in an opposite of the second direction until the probe contacts a fourth side of the selected feature.

2. The method of claim 1 wherein:
   the step of positioning the product relative to the probe in the first direction calculates a first measurement in the first direction;
   the step of positioning the product relative to the probe in an opposite of the first direction calculates a second measurement in the first direction;
   the step of positioning the product relative to the probe in the second direction calculates a first measurement in the second direction;
   the step of positioning the product relative to the probe in an opposite of the second direction calculates a second measurement in the second direction.

3. The method of claim 2 wherein the first direction is orthogonal to the second direction.

4. The method of claim 3 wherein:
   a coordinate of the center of the feature in the first direction is calculated by averaging the first and second measurements in the first direction; and
   a coordinate of the center of the feature in the second direction is calculated by averaging the first and second measurements in the second direction.

5. The method of claim 4 further including the step of determining contact of the probe by monitoring force feedback from the loadcell that is induced by the contact of the probe against a side of the selected feature.

6. The method of claim 5 wherein the step of determining contact of the probe further includes an indication of contact when force feedback from the loadcell surpasses a pre-determined setpoint.

7. The method of claim 4 further including the step of positioning the probe according to the coordinates of the center of the feature in the first and second directions.

8. The method of claim 1 wherein the feature is an aperture.

9. A method for locating a center of a selected feature of a sample in a materials testing application, comprising the steps of:
   providing a loadcell, including a probe;
   driving the sample in a first direction into a side of the probe until contact is detected at a point of contact; and
   backing the sample away from the probe by an offset distance from a point of contact.

10. The method of claim 9 wherein the offset distance is pre-determined.

11. The method of claim 9 further including the step of calculating the offset distance, wherein the step of calculating the offset distance includes the steps of:
    providing at least one expected force versus displacement curve;
    after the step of backing the sample away, relatively moving the probe in a second direction, orthogonal to the first direction, thereby deriving an actual force versus displacement curve;
    comparing the actual force versus displacement curves to the expected force versus displacement curves;
    if the actual force versus displacement curve differs substantively from the expected force versus displacement curves, then a step of adjusting the offset distance is performed and the driving step, the relatively moving step, the comparing step and the adjusting step are repeated until the actual force versus displacement curve substantively matches at least one of the expected force versus displacement curves.

12. The method of claim 11 including the steps of driving, relatively moving, comparing and adjusting are terminated after the actual force versus displacement curve substantively matches at least one of the expected force versus displacement curves.

13. The method of claim 12 further including the step of communicating results of the method.

14. The method of claim 11 wherein the actual force versus displacement curve differing substantively from the expected force versus displacement curves indicates that the sample is dragging on the probe during motion.

15. The method of claim 11 wherein the step of providing at least one expected force versus displacement curve includes providing a plurality of expected force versus displacement curves.

16. The method of claim 11 wherein the step of providing at least one expected force versus displacement curve includes providing a library of expected force versus displacement curves.

17. The method of claim 11 wherein the step of providing at least one expected force versus displacement curve includes providing a database of expected force versus displacement curves.

18. The method of claim 11 wherein the plurality of expected force versus displacement curves are previously generated by performing the driving step on a sample which is known to be free of dragging on the probe.

* * * * *